Figure 1:
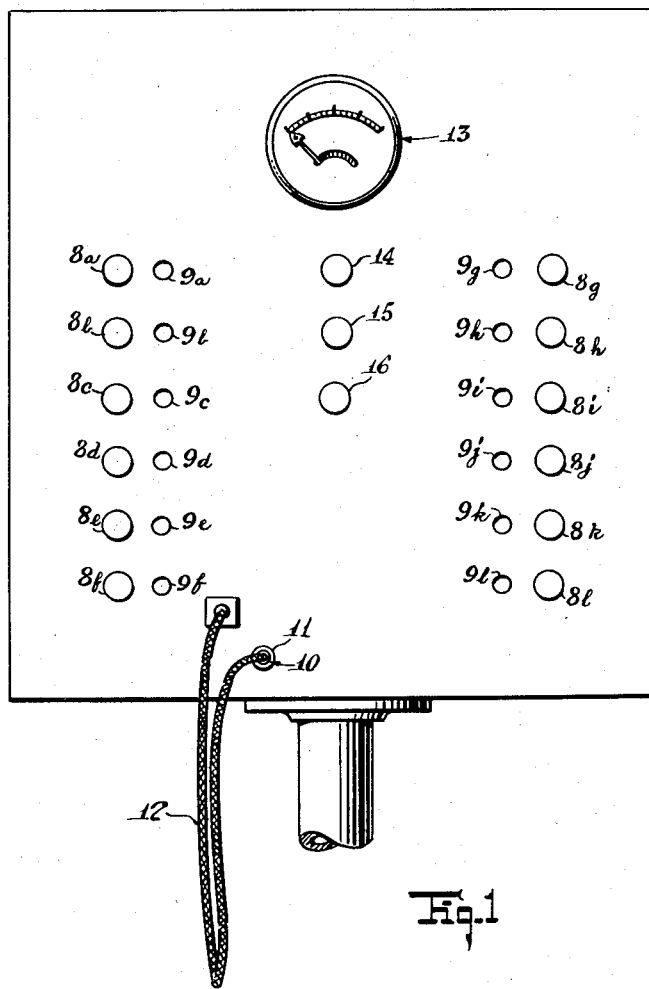

Dec. 11, 1951     C. H. ODELL ET AL     2,578,447

CONDITION-RESPONSIVE SYSTEM

Filed June 4, 1948     2 SHEETS—SHEET 1

Inventors
Carl H. Odell
Raymond B. Lewthwaite

Henry Lanahan
Attorney

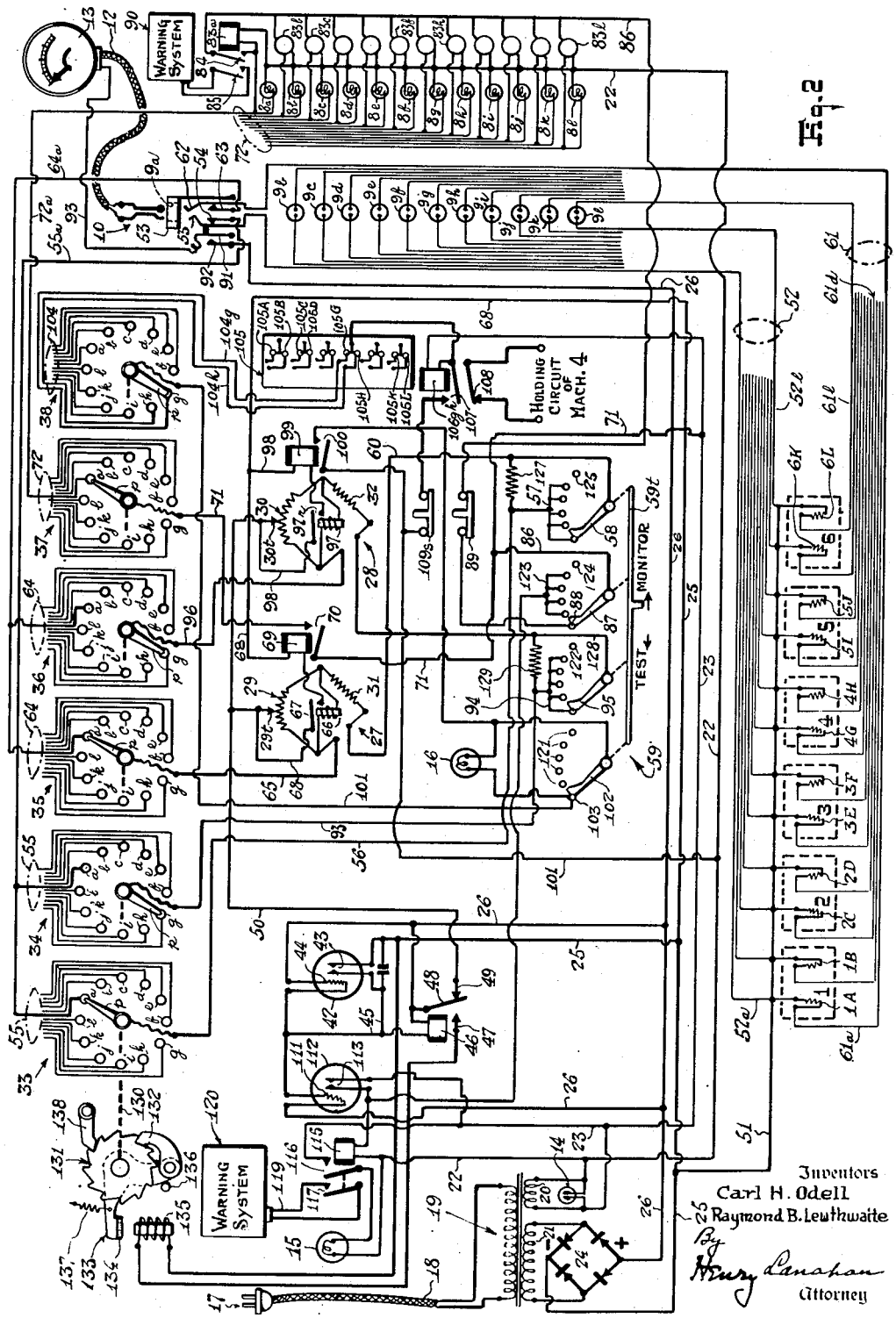

Patented Dec. 11, 1951

2,578,447

UNITED STATES PATENT OFFICE 2,578,447

CONDITION-RESPONSIVE SYSTEM

Carl H. Odell, Morristown, and Raymond B. Lewthwaite, River Edge, N. J., assignors to Thomas A. Edison, Incorporated, West Orange, N. J., a corporation of New Jersey Application June 4, 1948, Serial No. 31,036

9 Claims. (Cl. 177—311)

1

This invention relates to an electrical condition-responsive system for controlling, signaling, and/or measuring at a remote point in accordance with conditions prevailing at a plurality of widely-separated points. The invention has been especially embodied in the form of a temperature monitoring and control system for giving a warning signal whenever the temperature of any one of a series of bearings approaches an overheated condition—i. e., reaches a threshold value—and for stopping the machine or equipment having that bearing when the temperature thereof becomes dangerously high. It is in terms of such monitoring and control system that we do herein illustrate and describe our invention but without intending any unnecessary limitation thereto.

This invention has particular application to power stations, railway cars, etc. where there is the need to have a constant check on the condition of the bearings of the equipment. According to the present system a temperature-responsive impedance is placed in thermal association with each bearing and, by means of sequence switches, these impedances are connected successively to a control circuit which will produce a desired controlling action and give a signal when connection is made to any one of such impedances having an abnormal or threshold value. Heretofore, as far as is known, there has been the practice of stopping the sequence switches when an overheated bearing is detected, both so that a steady warning signal will be given and so that the switch will serve to indicate which of the several bearings is overheated. According to the present invention, however, the sequence switches are advanced regularly to successive positions irrespective of whether or not an overheated bearing is detected, and respective holding means are provided for the controlled devices corresponding to the bearings to retain each such device, when once operated, in its operated condition until it is purposely released by the operator. Thus, the present monitoring system is continuously effective to initiate steady signals corresponding to the respective bearings which become overheated at the instant each such overheating occurs; also, the present system is adapted to produce a suitable respective control action when a bearing becomes overheated.

Objects of the present invention are to provide condition-responsive systems of the character described, which are flexible so that they can be readily adapted to different applications and requirements, which are continuously operative to give a constant check on the equipment being

2 monitored, which will give an appropriate signal in case of failure of the system itself, which can be readily tested for operability, and which enable the attendant to measure selectively the values of the several conditions being checked as desired.

These and other objects and features of our invention will be apparent from the following description and the appended claims.

In the description of our invention reference is had to the accompanying drawings, of which:

Figure 1 is a front view of a typical panel for a monitoring and control system of the present character; and Figure 2 is a diagrammatic view of circuits and mechanism of one illustrative embodiment of the present invention.

The system shown in the accompanying figures is, by way of illustration, for monitoring and controlling a series of engines 1 to 6 inclusive, diagrammatically shown, as of a power station. Further, by way of illustration, each of these engines is considered as having two bearings with which are respectively associated temperature-responsive resistors designated by the numbers of the respective engines with the suffix letters A to L, the bearings of engine 1 being 1A and 1B, of engine 2 being 2C and 2D, of engine 3 being 3E and 3F, etc. The present apparatus may have a control panel 7 (Figure 1) on which there is a signal light for each temperature-responsive resistor designated by the figure 8 with the suffix letter of the resistor to which it corresponds, the suffix letters in these and other instances hereinafter described being however lower case. These signal lights are arranged suitably in two columns of six each. Also on the panel 7 there are jacks corresponding to the respective signal lights designated by the number 9 with the suffix letters of the corresponding temperature-responsive resistors, these jacks being mounted adjacent to the corresponding signal lights also in two columns of six each. As will be apparent from the following description, connection may be made to the respective temperature-responsive resistors by inserting a connector plug 10 into the corresponding jack. This plug 10 is normally supported in a holding jack 11 as when it is not in use. Connected to this plug is a cable 12 (partly shown) which leads to an indicating meter 13 which is for measuring the temperature of the respective bearings, it being understood that when the plug 10 is inserted in any one of the jacks 9 the meter 13 will indicate directly the temperature of the corresponding bearing. This meter and its associated circuits is preferably of a ratio type shown and described in detail in the Kelly Patent 2,362,562 issued November 14, 1944. Since an understanding of the details of this meter is not necessary to an understanding of the present invention, the same are not herein described.

Also on the panel 7 there are three signal lights 14, 15 and 16. The light 14 serves to indicate when power is supplied to the system, the light 15 serves as a general warning signal to indicate when the system itself is out of order, and the light 16 serves as a signal for testing the system for operability.

The power supply for the present system may be a usual 115-volt A. C. line to which connection may be made by a plug 17 and cable 18 (Figure 2). This cable is connected to the primary of a power transformer 19 which has two secondary windings 20 and 21. The winding 20 connects to leads 22 and 23 to supply A. C. power to various components of the system; it is across this winding that the aforementioned signal light 14 is connected. The winding 21 connects to a full-wave rectifier 24. From this rectifier there run two leads 25 and 26 to supply D. C. power to different components of the system, the leads 25 and 26 being respectively at negative and positive potentials, as indicated in Figure 2.

There are in the present system two electrical Wheatstone bridges 27 and 28. These bridges have therein resistors 29 and 30 respectively which are provided with respective variable taps 29t and 30t by way of which D. C. current is supplied to the bridges. These taps, which serve as junctions between the two branches of the respective bridges, divide the resistors 29 and 30 into sections which form two arms of the respective bridges; also, the taps serve as a means for varying the balance of the bridges. Additionally, the bridges include resistors 31 and 32 respectively which constitute third arms thereof. The fourth arm of each bridge is to be formed by the temperature-responsive resistors 1A to 6L respectively. For connecting these resistors successively to these bridges, and performing simultaneously other corresponding operations, there is provided a bank of six sequence switches 33 to 38. Each of these sequence switches has a rotatably-mounted switch pole p and a series of cooperating contacts corresponding to the temperature-responsive resistors 1A–6L which are designated by the letters of the corresponding resistors.

The switch poles p have one drive connection represented by dash lines 130 to a ratchet wheel 131. Engaging this ratchet wheel is a drive pawl 132 carried by a pivoted rock lever 133. This lever has an arm carrying a magnetic bar 134 serving as the armature of an electromagnet 135. The lever is urged in the position shown, against a suitable stop 136, by a spring 137. When the electromagnet is energized the lever 133 is actuated in a counterclockwise direction through a distance sufficient to advance the poles p from one contact to the next. When the electromagnet is next deenergized the lever 133 is returned by the spring 137 but the ratchet wheel is held stationary by a detent 138. Thus, upon intermittently energizing the electromagnet step advance of the sequence switches is effected.

For so intermittently energizing the electromagnet 135 there is provided a thermal relay 42 comprising a pair of thermally-responsive switch members 43 which are biased closed and are opened in response to the heating effect of an associated heater 44. One of the switch members is connected to the negative lead 25 and the other is connected by a lead 45 to one terminal of the heater. The other terminal of this heater is connected to the positive lead 26. Thus, when the switch members 43 are closed the heater is energized. After an interval of such energization, typically one second, the switch members are opened and the energizing circuit is broken to open the heater circuit. At the expiration of an interval of cooling of the heater, typically five seconds, the switch members are reclosed and the cycle repeats itself. A relay 46 is connected across the negative and positive leads 25—26 by way of the switch members 43. In turn the electromagnet 135 is connected across the negative and positive leads 25 and 26 by way of a stationary contact 47 and associated movable switch 48 of the relay 46, these switch elements being open when the relay is not energized. Thus, when the switch members 43 are closed the power supply circuit of the electromagnet 135 is closed to advance the sequence switches one step, and when the switch members 43 are next opened the ratchet drive is returned but the sequence switches remain stationary. Since the thermal relay 42 has such timing that its contacts are closed for an interval of approximately one second and then opened for a succeeding interval of approximately five seconds, the sequence switches are advanced one step every six seconds. These time intervals are however illustrative and may be varied.

During the intervals the relay 46 is not energized the pole member 48 thereof connects to a stationary contact 49 to connect the positive lead 26 to a lead 50 running to the junctions or taps 29t and 30t of the bridges 27 and 28. This serves to supply intermittent D. C. power to the bridges during the intervals the sequence switches are at standstill. However, as the sequence switches are advanced, this power supply to the bridges is cut off by the relay 46 to allow a restoration of the devices controlled by the respective bridges as will be hereinafter apparent.

The sequence switches 33 and 35 are utilized to connect the temperature-responsive resistors 1A to 6L to the bridge 27, the positions in which these switches appear in Figure 2 being those for connecting the resistor 1A to this bridge. For instance, one terminal of the temperature-responsive resistor 1A—which is the grounded side thereof connected by a lead 51 to the negative lead 25—is connected by way of a lead 52a of a cable 52 to one switch member 53 of the jack 9a. When this jack is free of a connector plug, as shown, the switch member 53 makes contact with a switch member 54 that is connected by a lead 55a of a cable 55 to the contact a of the sequence switch 33. The pole p of this sequence switch, which now registers with the contact a, is connected by way of a lead 56, contact bank 57 and associated switch pole 58 of a test switch 59 hereinafter described, and a lead 60 to the bridge 27. At the same time the ungrounded terminal of the respective temperature-responsive resistor 1A is connected by a lead 61a of a cable 61 to a switch member 62 of the jack 9a. This switch member 62 makes contact with a switch member 63 of the jack and the latter is connected by a lead 64a of a cable 64 to the contact a of the sequence switch 35. The pole p of this sequence switch, which now also registers with the contact a, is connected directly by a lead 65 to the bridge 27. Thus the resistor 1A is connected into the bridge 27 to constitute the fourth arm thereof.

The lead 51, together with the lead 50 running to the tap 29t, serve as the power supply leads to the bridge 27. It may here be noted that the power supply lead 50 is not connected directly to the fixed elements of the bridge, as to the terminal of the resistor 31, but is instead connected directly to the grounded side of the temperature-responsive resistor 1A. This is done so that the lead 52a, which connects the grounded side of the resistor 1A to the other bridge elements, will appear in one branch of the bridge and the lead 61a which connects the other side of the resistor 1A to the other bridge elements will appear in the other branch of the bridge. Temperature-responsive resistors are usually quite remote from the control station and the leads 52a and 61a will typically be quite long and have appreciable resistance. However, these resistors will be ordinarily nearly equal and will vary substantially alike with temperature change; accordingly, since they are connected in opposite branches of the bridge, their effects on the bridge are balanced out.

Connected diagonally across the bridge 27 is a sensitive master relay 66 having a pair of normally-open contacts 67. These contacts are connected in a circuit 68 running from the lead 50 (which is connected intermittently to the positive lead 26) to the negative lead 25 of the D. C. power supply; this circuit 68 serially includes a slave relay 69. The bridge 27 is arranged so that it is substantially balanced when the temperature-responsive resistors connected thereto have a normal value. However, when any one of the bearings being checked becomes heated to a predetermined abnormal or threshold temperature, which may possibly result in damage to the bearing, the bridge will be so unbalanced as to operate the master relay 66 and cause, in turn, operation of the slave relay 69.

The slave relay 69 has a pair of normally-open contacts 70 which are connected in a circuit 71 running from the A. C. power supply lead 23 to the pole p of the sequence switch 37. The pole of this switch now also registers with the contact a. The contact a of this switch 37 is connected by a lead 72a of a cable 72 to one terminal of the signal lamp 8a corresponding to the resistor 1A. The other terminal of this signal light is connected to the other supply lead 22. Thus, if the relay 69 is energized in response to an unbalance of the bridge caused by overheating of the bearing corresponding to the resistor 1A, the signal light 8a is lit to give a warning.

Also, as soon as the slave relay 69 is so energized in response to overheating of the resistor 1A, a corresponding slave relay 83a, which is connected in parallel with the signal light 8a, is energized. This relay 83a has two pairs of normally-open contacts 84 and 85 which are closed when the relay is energized. The contacts 84 are in a circuit 86 which runs from the lead 71 (that is connected to the A. C. supply lead 23) through a pole 87 and contact 88 of the test switch 59 and through a normally-closed manual switch 89 to the terminal of the relay 83 connected to the lead 72a; since the other terminal of this relay is connected to the A. C. supply lead 22, steady power is supplied to the relay 83a once the contacts 84 are closed to hold the relay in its operated condition. Because of its function, the circuit 86 is herein termed a "holding circuit" for the relay 83. For instance, when the relay 83a is first closed in response to operation of the slave relay 69, the circuit running from the A. C. supply lead 23 by way of the lead 71, pole p and contact a of sequence switch 37, and lead 72a, is in parallel with the holding circuit running from the A. C. supply lead 23 by way of the lead 86. The first circuit by way of the sequence switch 37 is broken as soon as this switch is advanced to its next position but the holding circuit remains closed to retain the relay 83a and corresponding signal light 8a operated until the holding circuit is broken. This breaking of the holding circuit to release the relay and shut off the signal light 8a is effected by momentarily pressing the switch 89.

The second pair of contacts 85 of the relay 83a controls a warning system 90 designated as such by a legend in Figure 2. This system 90 is suitably one which will give a warning sound to supplement the warning signal 8a.

The attendant may measure the temperature of any of the bearings at any time by inserting the plug 10 into the corresponding jack and observing the temperature on the meter 13. As the plug 10 is inserted in the jack 9a for instance, the respective temperature-responsive resistor is disconnected from the sequence switches 33 and 35 by the switch members 53 and 62 breaking contact with the associated members 54 and 63, but this has no effect on the signaling given at the moment because the signal light 8a stays on when once lit until the respective relay 83a is released as above explained; at the same time the switch members 53 and 62 are connected to the two leads of the cable 12 and the switch members 91 and 92 of the jack 9a are closed to connect a power supply lead 93 of the meter to the positive lead 26 of the D. C. power supply. As described in the aforementioned Kelly patent the meter 13 will now read continuously the temperature of the bearing corresponding to the jack 9a.

Although there is a relay 83 corresponding to each temperature-responsive resistor, only the relay 83a, coresponding to the resistor 1A, is shown in detail in Figure 2 so as to avoid undue complexity of the drawing. The relays corresponding to the other temperature-responsive resistors, as well as the jacks 9, are however diagrammatically represented and referred to by the reference characters 83 and 9 with the respective suffix letters of the corresponding temperature-responsive resistors. From the foregoing description of the monitoring operation of the system in response to a rise in temperature of the resistor 1A to a threshold value, the monitoring operation of the system in response to the other temperature-responsive resistors will be apparent.

In addition to the monitoring operations above described, the present system is adapted to perform a suitable control action when the temperature of a bearing reaches an upper limit at which it is unsafe to continue operation of the machine; in the present embodiment this control action is to stop the machine having the overheated bearing. For this purpose there is provided the second electrical bridge 28. This bridge is connected successively to the temperature-responsive resistors 1A to 6L by the sequence switches 34 and 36 in the same manner as the switches 33 and 35 connect these resistors to the bridge 27; however, the poles of the sequence switches 34 and 36 are shifted relative to those of the switches 33 and 35, as for example by the angular distance of six successive positions, both so that the bridges 27 and 28 will not be connected simultaneously to any one temperature-responsive resistor and so that each temperature-responsive resistor will be connected to the bridge 28 at a suitable interval after it has been last connected to the bridge 27. This interval is preferably less than the minimum period in which a bearing would likely reach the upper limit at which the engine should be stopped after having passed the lower limit indicating that the bearing is becoming overheated. By way of illustration, the poles of switches 34 and 36 are delayed by the distance of six switch positions behind the poles of the switches 33 and 35 to cause the bridge 28 to be connected to each temperature-responsive resistor at an interval of approximately thirty-six seconds following the instant the same was last connected to the bridge 27.

The circuit for connecting successively the grounded side of the temperature-responsive resistors to the bridge 28 comprises the respective leads of the cable 52, the respective jack 9, and the respective lead of the cable 55, it being noted that each lead of this cable connects to the respective contacts of both sequence switches 33 and 34. The pole p of the sequence switch 34 is connected by a circuit 93, including a bank of contacts 94 and switch pole 95 of test switch 59, to the bridge 28. The circuit for connecting successively the other side of the temperature-responsive resistors to the bridge 28 comprises the respective leads of the cable 61, the respective jack 9 and the respective leads of the cable 64, it being noted here again that each lead of the cable 64 connects to the respective contacts of both sequence switches 35 and 36. The pole p of the sequence switch 36 is connected directly by a lead 96 to the bridge 28.

Connected diagonally across the bridge 28 is a sensitive master relay 97 having a pair of normally-open contacts 97r. These relay contacts are in a circuit 98 running from the lead 50, which is connected intermittently to the positive lead 26 of the D. C. power supply, to the lead 68 that connects to the negative lead 25 of the D. C. power supply. Serially included in the circuit 98 is a slave relay 99 having a pair of normally open contacts 100. The contacts 100 are in a circuit 101 running from the negative lead 22 to the pole p of the sequence switch 38 by way of a pole 102 and contact 103 of the test switch 59. The contacts of this switch are connected by respective leads of a cable 104—the leads being designated by the number of the cable with the suffix letters of the temperature-responsive resistors to which they correspond such as leads 104g and 104h for resistors 4G and 4H as shown—to a bank 105 of terminals 105A to 105L inclusive. These terminals are connected together in pairs according to the grouping of the bearings in the respective engines. Connected to each terminal pair is a respective slave relay as for instance the relay 106gh for the terminal pair 105G—105H. This relay has a normally-open pair of contacts 107 and a normally-closed pair of contacts 108. The contacts 107 are in the circuit 109 running from the lead 101 (which connects to the negative lead 22) through the relay 106gh to the positive lead 23; in this circuit there is serially included a normally-closed manual switch 109s. Thus, as soon as the relay is energized to close the contacts 107 the circuit 101 continues to supply current to the relay to serve as a holding circuit to retain the relay in its operated condition until the switch 109s is next opened. The normally-closed contacts 108 are in the holding circuit 110 for the respective engine, which is the engine 4 having the temperature-responsive resistors G and H as shown. When the relay 106gh is operated, the contacts 108 are opened and the engine is stopped.

The controlling action of the bridge 28 may be briefly summarized as follows, the description being with respect to the temperature-responsive resistors G and H of the engine 4. At an interval of approximately thirty-six seconds after the resistors 4G and 4H have been connected to the bridge 27, the same are connected in succession to the bridge 28. If either of these resistors has an abnormally-high value approaching the upper limit at which the bridge 28 is set to operate, the master relay 97 is closed to operate in turn the slave relay 99. At the moment the slave relay 99 is operated it is connected by the sequence switch 38 to the slave relay 106gh, which corresponds to the engine 4, to operate this relay. As soon as this relay is operated engine 4 is stopped. At the same time a holding circuit for the relay 106gh is rendered effective to retain the engine in its stopped condition. When the engine has been restored to working condition the release switch 109a is depressed momentarily to restore the relay 106gh and allow the engine 4 to be restarted.

If the heater of the thermal relay 42 should fail so that the switch members 43 of this relay should not open and cause thus the motor means for the sequence switches to be inoperative, power would be supplied continuously to a heater 111 of a thermal relay 112 which has a normally-open pair of contacts 113. This latter relay has an operate time much greater than that of the relay 42, it being typically about thirty seconds, so that the latter relay is not operated during normal operation of the system. However, at the expiration of a thirty-second interval following the failure of the thermal relay 42 to open its contacts as just noted, the contacts 113 are engaged to close a circuit 114 connected across the A. C. supply leads 22 and 23; this circuit 114 serially includes a relay 115. This relay 115 has two pairs of normally-open contacts 116 and 117. The contacts 116 are in a circuit 118 connected across the A. C. supply leads 22 and 23, which circuit serially includes a signal lamp 15. The contacts 117 are in a circuit 119 which leads to a warning system 120 adapted to supplement the signal light 15 with a suitable sound alarm. Thus, the attendant is warned if a failure of the motor means of the sequence switches should occur.

The test switch 59 is shown in its normal or unoperated position indicated as "monitor," which is the position it is to occupy when the monitoring system is in use. In this monitoring position of this switch the four poles 102, 95, 87 and 58 thereof are connected respectively to the contacts 103, contact 94, contact 88 and contact bank 57 to complete the circuits hereinbefore described. As the test switch is moved from "monitor" to "test" position—which is to move the poles of the switch clockwise—four actions occur: (1) the pole 102 is swept across a series of idle contacts 121, there being five shown by way of illustration, (2) the pole 95 is swept through the bank 94 of five contacts and then engages an idle contact 122, (3) the pole 87 is swept through a bank 123 of four contacts separate from the contact 88 and then engages an idle contact 124, and (4) the pole 58 is swept through a bank 57 of five contacts and then engages an idle contact 125. The effect of the pole 58 moving from the bank 57 to the idle contact 125 is to break a short circuit across a resistor 127 so that this resistor appears serially in the line 56, which is the line by which the temperature-responsive resistors IA to 6L are connected into the bridge 27. Similarly, the effect of the pole 95 moving from the bank 94 to the idle contact 122 is to remove a short circuit 128 from a resistor 129 and introduce this resistor serially in the line 93, which is the line by which the temperature-responsive resistors IA—6L are connected into the bridge 28. The resistors 127 and 129 have values such that they will unbalance the bridges 27 and 28 respectively, to cause the respective master relays 66 and 97 to be operated, even though the temperature-responsive resistors have values in a normal range. It is to be noted though that this unbalance does not occur until the test switch has traversed all intervening positions and reached its most clockwise or "test" position. The effect of the pole 87 breaking with the contact 88 in the initial clockwise movement of the test switch towards "test" position is to break the holding circuit for the relays 83 (of which only the relay 83a of this group is shown) so that each of these relays will be restored and the corresponding signal lamp 8 will be shut off as the pole of the sequence switch 37 is moved from each corresponding position to the next. Further, as the pole 102 breaks with the contact 103 in the initial movement of the test switch towards "test" position a short is removed from the signal lamp 16 to introduce this lamp serially in the line 101 that leads to the relays 106. The signal light 16 is adapted to light when so connected serially with the respective relays 106 but is adapted to introduce sufficient resistance in the line to prevent the relays from operating.

When in the movement of the test switch 59 between "monitor" and "test" positions the pole 87 makes contact with the intermediate bank 123 of contacts, an energizing circuit is completed across the A. C. supply leads 22 and 23 through the relay 115 to operate this relay and cause the signal lamp 15 to light and the warning system 120 to be put in operation. This is done so that the operator is apprised whenever the test switch is out of its "test" and "monitor" positions. Upon sweeping the test switch from one such position to the next it will be understood that this warning means is in operation only momentarily.

From the foregoing paragraph, it will be understood that as the test switch 59 is moved from "test" to "monitor" positions, the holding circuit for the relay 83, controlled by the bridge 27, is first broken and the signal light 16 is connected in the circuit 101 controlled by the bridge 28; next the signal light 15 and warning signal 120 are put on for the purpose just noted; and lastly the resistors 127 and 129 are connected respectively into the bridges 27 and 28 to unbalance these bridges and cause the respective master relays to be operated. The reason for providing the test switch with a series of intermediate positions is so that a moment will elapse between the instant the holding circuit for relays 83 is broken and the instant the bridges are unbalanced to allow any of these relays 83, which may be operated, to be restored before the bridge 27 is unbalanced by the resistor 127. While the switch 59 is held in "test" position it will be understood, since the motor means for the sequence switches is operative continuously in the present system, that the signal lights 8 will flash on momentarily, in succession, provided the monitoring portion of the present system (comprising sequence switches 33, 35 and 37, bridge 27 and relay 83) is in proper working condition; simultaneously, the signal light 16 will be flashed on intermittently, once for each position of the sequence switches, provided the controlling portion of the system (comprising sequence switches 34, 36 and 38, bridge 28 and relays 106) is working properly.

It is to be understood that the specific embodiment herein particularly shown and described is illustrative but not limitative of our invention. While we show bridges of the Wheatstone type and temperature-responsive resistors for controlling these bridges, our invention contemplates any suitable type of electrical bridge or controlling circuit and condition-responsive impedance elements for controlling these bridges or circuits. Furthermore, it is to be noted that the signal lights 8 and their controlling circuits constitute a measuring means in that they indicate when the temperature of any of the respective bearings exceeds a threshold value. In the claims such and other measuring and/or signaling is contemplated by the term "indicating." Also, in interpreting the claims it is intended that the term "groups of temperature-responsive impedances" shall be construed as including one or more of such impedances.

We claim:

1. In an electrical system of the character described: the combination of an electrical bridge; means for supplying current to said bridge; a plurality of condition-responsive impedances respectively adapted to constitute an arm of said bridge; means adapted to respond when said bridge is in a predetermined condition of unbalance; a sequence switch having successive positions for connecting said impedances successively into said bridge, said bridge being so arranged that it is in said predetermined condition of unbalance when the impedance connected thereto is at a selected threshold value; motor means for advancing said switch; and means timed with said motor means and connected to said current-supplying means for intermittently interrupting said current-supplying means to cause said electrical bridge to be deenergized during successive intervals while said switch is being advanced from one position to the next.

2. In an electrical system of the character described: the combination of an electrical bridge; a plurality of condition-responsive impedances respectively adapted to constitute an arm of said bridge; means adapted to respond when said bridge is in a predetermined condition of unbalance; a sequence switch having successive positions for connecting said impedances successively into said bridge, said bridge being so arranged that it is in said predetermined condition of unbalance when the impedance connected thereto is at a selected threshold value; motor means recurrently energizable to intermittently advance said switch to successive positions; a common current-supplying means for said bridge and said motor means; and means for alternately connecting said current-supplying means to said bridge and said motor means.

3. The combination set forth in claim 2 wherein said last-stated means comprises a thermal relay having a temperature-responsive switch and a heating element for recurrently operating said switch to recurrently energize said motor means, said thermal relay being so timed that current is supplied to said bridge for substantially longer periods than it is to said motor means.

4. In an electrical system of the character described: the combination of an electrical bridge; means for supplying current to said bridge; a plurality of condition-responsive impedances respectively adapted to constitute an arm of said bridge; means adapted to respond when said bridge is in a predetermined condition of unbalance; a sequence switch having successive positions for connecting said impedances successively into said bridge, said bridge being so arranged that it is in a predetermined condition of unbalance when the impedance connected thereto is at a selected threshold value; motor means for advancing said switch; a current-supply circuit for said motor means; time-controlled means operated at regular intervals for intermittently interrupting said motor circuit to effect a step advance of said switch; warning means; and current-operable control means for said warning means energized intermittently in timed relation with the interruptions of said motor circuit, said control means including delay means adapted to cause said warning means to be operated only in response to a failure of said motor-circuit interrupting means.

5. In an electrical apparatus of the character described: the combination of an electrical bridge; means for supplying current to said bridge; a plurality of groups of condition-responsive impedances; circuit means including a first sequence switch means operated to connect said impedances successively into a branch of said bridge, said bridge being adapted so that it is in a predetermined condition of unbalance when the impedance included therein has a threshold value different from its normal value; an operable device corresponding to each of said impedance groups; circuit means including a second sequence switch means correlated with said first sequence switch means for placing said devices successively under the controlling influence of said bridge in such timed relation that each device is under said controlling influence during the time each of the impedances of the group corresponding thereto is connected to said bridge, each of said operable devices being adapted to operate when coupled to said bridge upon the bridge being in said condition of unbalance; motor means for advancing said sequence switch means; and means timed with said motor means and connected to said current-supplying means for intermittently interrupting said current-supplying means to cause said electrical bridge to be deenergized during successive intervals while said switch means are being advanced.

6. In a system of the character described: the combination of a condition-responsive impedance; an electrical bridge adapted to include said impedance as an arm thereof, said bridge being in a predetermined condition of unbalance upon said impedance having a predetermined abnormal value; an operable device controlled by said bridge, test means for said system including means for placing said bridge in said condition of unbalance while said impedance has a normal value; test-indicating means; and means for including said test-indicating means in the circuit of said operable device to render the latter unresponsive to said bridge while causing the indicating means to be responsive to unbalance of the bridge.

7. In an electrical apparatus of the character described: the combination of a plurality of groups of condition-responsive impedances; first and second electrical control circuits each adapted to include said impedances respectively, said control circuits being operated upon any one of the impedances connected thereto having a predetermined abnormal value; a first set of indicating devices including one corresponding to each of said impedances; a second set of operable devices including one corresponding to each of said impedance groups, the devices of said first and second sets being controlled by said first and second control circuits respectively; a multipole sequence switch means step-operated at regular intervals to connect said impedances and corresponding ones of said indicating devices, in succession, to said first control circuit and concurrently to connect different ones of said impedances and corresponding ones of said operable devices, in succession, to said second control circuit; and releasable holding means for each of said devices for retaining the respective device in operated condition when once operated until the holding means is released.

8. In an electrical apparatus of the character described: the combination of an electrical bridge; a plurality of groups of condition-responsive impedances; circuit means including a first sequence switch means operated to connect said impedances successively into a branch of said bridge, said bridge being adapted so that it is in a predetermined condition of unbalance when the impedance included therein has a threshold value different from its normal value; an operable device corresponding to each of said impedance groups; circuit means including a second sequence switch means correlated with said first sequence switch means for placing said devices successively under the controlling influence of said bridge in such timed relation that each device is under said controlling influence during the time each of the impedances of the group corresponding thereto is connected to said bridge, each of said operable devices being adapted to operate when coupled to said bridge upon the bridge being in said condition of unbalance; a second electrical bridge; an indicating device corresponding to each of said impedances and adapted to be controlled by said second bridge; and a third sequence switch means for connecting said impedances successively into said second bridge and for concurrently placing corresponding ones of said indicating devices under the controlling influence of said second bridge, said third switch means being operated in such timed relation to said first and second switch means that no one of said impedances is ever connected simultaneously to both of said bridges.

9. In an electrical apparatus of the character described: the combination of an electrical bridge; a plurality of groups of condition-responsive impedances; circuit means including a first sequence switch means operated to connect said impedances successively into a branch of said bridge, said bridge being adapted so that it is in a predetermined condition of unbalance when the impedance included therein has a threshold value different from its normal value; an operable device corresponding to each of said impedance groups; circuit means including a second sequence switch means correlated with said first sequence switch means for placing said devices successively under the controlling influence of said bridge in such timed relation that each device is under said controlling influence during the time each of the impedances of the group corresponding thereto is connected to said bridge, each of said operable devices being adapted to operate when coupled to said bridge upon the bridge being in said condition of unbalance; a test-indication means; a testing device movable into "test" position to cause said bridge to be placed in said condition of unbalance upon the bridge being connected to said impedances respectively; and means operated by said test device as it is moved to "test" position for placing said test-indication means under the controlling influence of said bridge while concurrently removing said operable devices from the controlling influence of said bridge.

CARL H. ODELL.
RAYMOND B. LEWTHWAITE.

REFERENCES CITED

The following references are of record in the file of this patent:

UNITED STATES PATENTS

| Number | Name | Date |
| --- | --- | --- |
| 1,443,165 | Brown | Jan. 23, 1923 |
| 1,460,530 | Brown et al. | July 3, 1923 |
| 1,809,020 | Burdick | June 9, 1931 |
| 1,954,170 | Gibbs et al. | Apr. 10, 1934 |
| 2,043,673 | Obergfell et al. | June 9, 1936 |
| 2,278,939 | Muehter | Apr. 7, 1942 |
| 2,304,698 | Leathers | Dec. 8, 1942 |
| 2,407,361 | Wilson | Sept. 10, 1946 |
| 2,440,002 | Bower | Apr. 20, 1948 |
| 2,444,733 | Gille et al. | July 6, 1948 |
| 2,449,304 | Lamb | Sept. 14, 1948 |

FOREIGN PATENTS

| Number | Country | Date |
| --- | --- | --- |
| 502,711 | Great Britain | Mar. 23, 1939 |
| 612,362 | Great Britain | Nov. 11, 1948 |